United States Patent [19]

Mastandrea et al.

[11] Patent Number: 5,295,391
[45] Date of Patent: Mar. 22, 1994

[54] METHOD AND APPARATUS FOR DETECTING LEAKS IN THE ULLAGE OF A LIQUID STORAGE TANK

[75] Inventors: John R. Mastandrea, Redondo Beach; Stewart H. Wells, North Hills; David B. Peck, Torrance; Steven T. Jersey, Redondo Beach, all of Calif.

[73] Assignee: NDE Environmental Corporation, Torrance, Calif.

[21] Appl. No.: 833,681

[22] Filed: Feb. 11, 1992

[51] Int. Cl.⁵ .............................................. G01M 3/32
[52] U.S. Cl. ....................................................... 73/49.2
[58] Field of Search ................. 73/40, 40.5 R, 49.2 T, 73/49.2 R

[56] References Cited

U.S. PATENT DOCUMENTS

| | | | |
|---|---|---|---|
| 3,813,922 | 6/1974 | Oswald et al. | 73/49.2 R |
| 3,818,752 | 6/1974 | Lindeberg | 73/49.2 T |
| 3,872,712 | 3/1975 | Westervelt et al. | 73/40 |
| 4,474,054 | 10/1984 | Ainlay | 73/49.2 T |
| 4,532,795 | 8/1985 | Brayman et al. | 73/49.2 R |
| 4,649,739 | 3/1987 | Horner | 73/49.2 T |

*Primary Examiner*—Hezron E. Williams
*Assistant Examiner*—Michael J. Brock
*Attorney, Agent, or Firm*—Owen, Wickersham & Erickson

[57] ABSTRACT

Apparatus and method for detecting leaks within underground or aboveground tanks and their associated piping whether the tank and/or piping is partially filled or empty. The apparatus is partially insulated to minimize temperature effects when injecting a test gas into the tank to be tested. The tank is pressurized to a fill pressure by injecting (bubbling) the test gas through any liquid in the tank. Once stabilized the pressure is reduced to a test pressure while the gas injection continues. The flow rate of gas into the tank is monitored by a flow meter able to measure small flows while the pressure is held constant by a pressure regulator having a high accuracy and the temperature of the ullage is monitored. A tight or leaking tank is determined by evaluating the flow rate of constant pressure against reference criteria which when met identify a tight tank and when not met identify a leaking tank under EPA guidelines. Temperature, deflection, and other effects on leak rate detection are compensated for by prescribing waiting periods, filling times, and multiple and repeat threshold exceedance criteria. Flow rate, temperature and pressure can be reached manually or fed to a suitable computer or chart recorders for permanent records and/or automated testing.

18 Claims, 8 Drawing Sheets

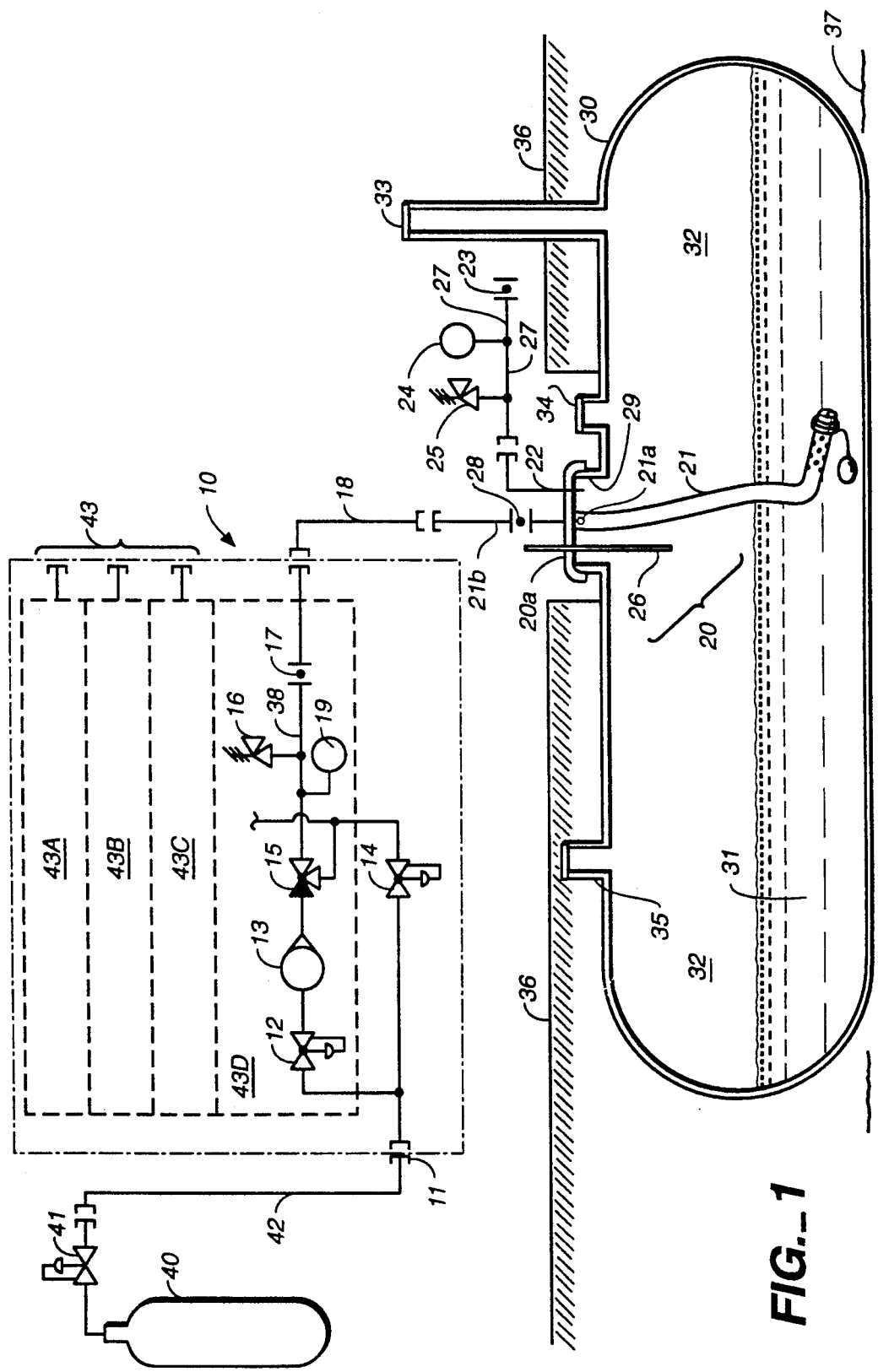
FIG._1

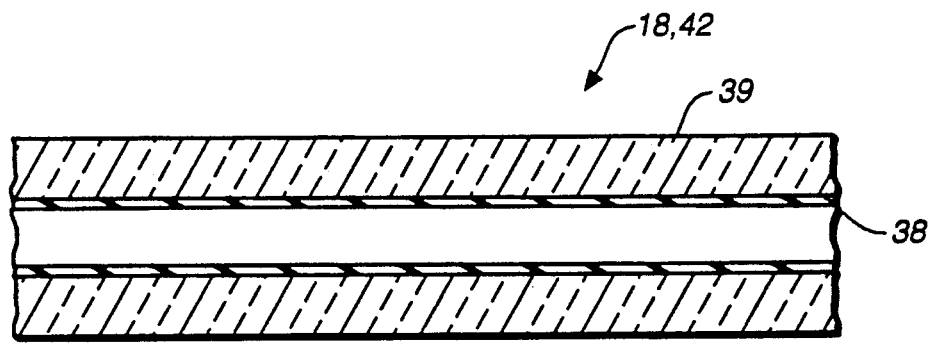
FIG._2
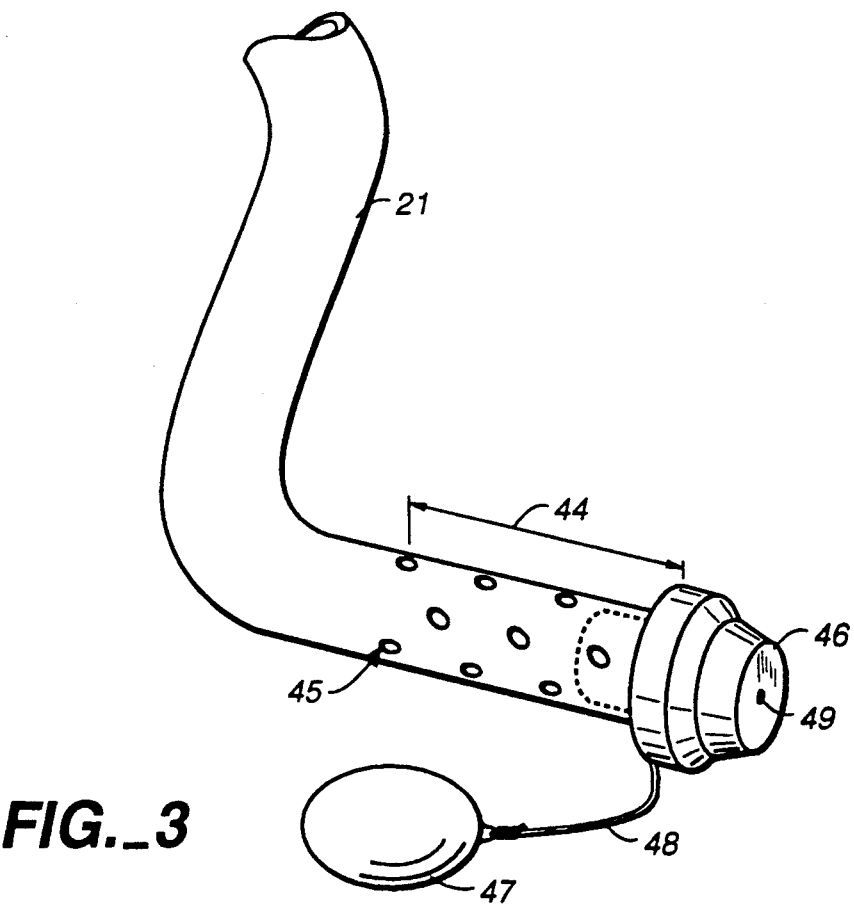
FIG._3

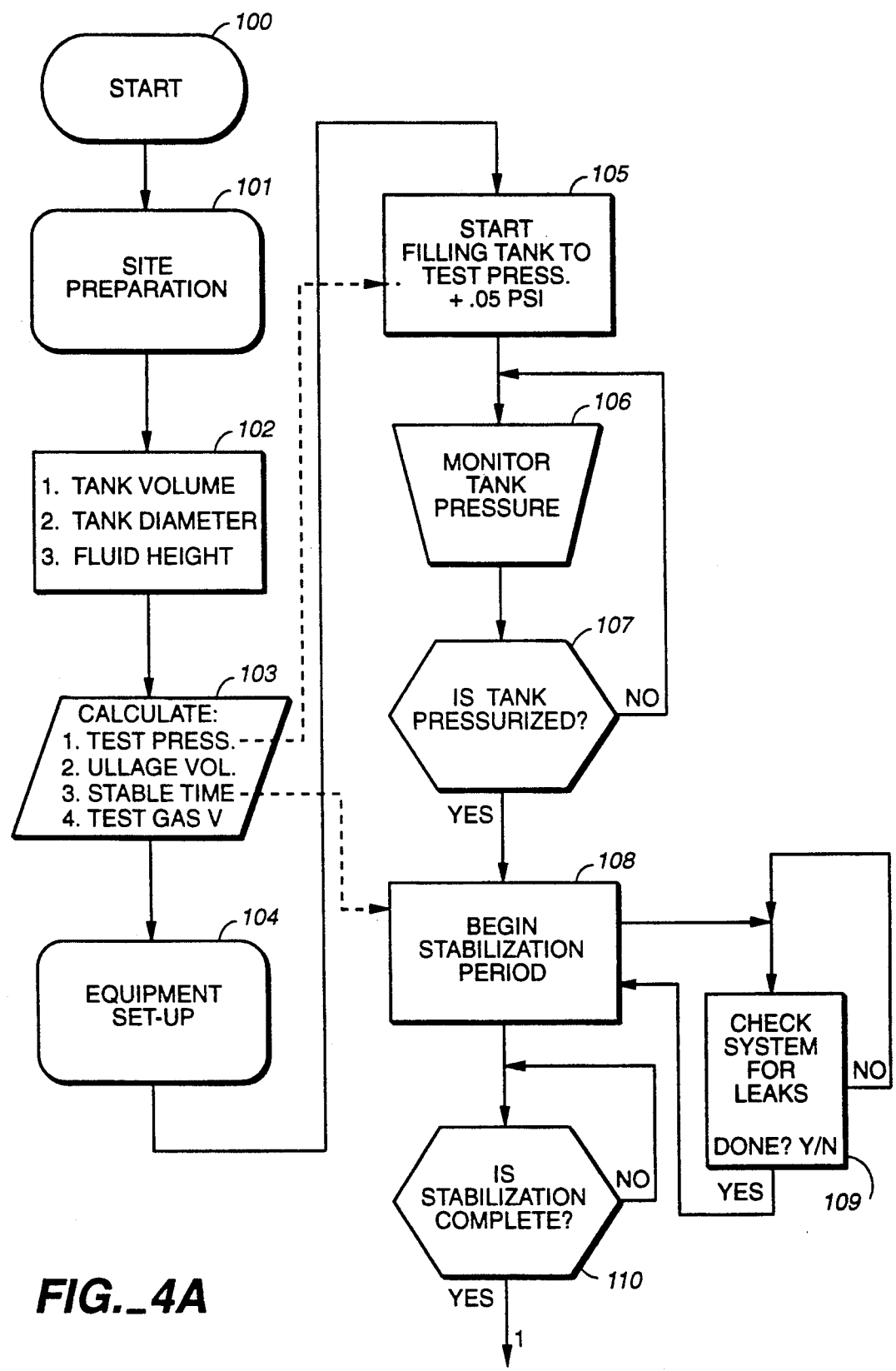
FIG._4A

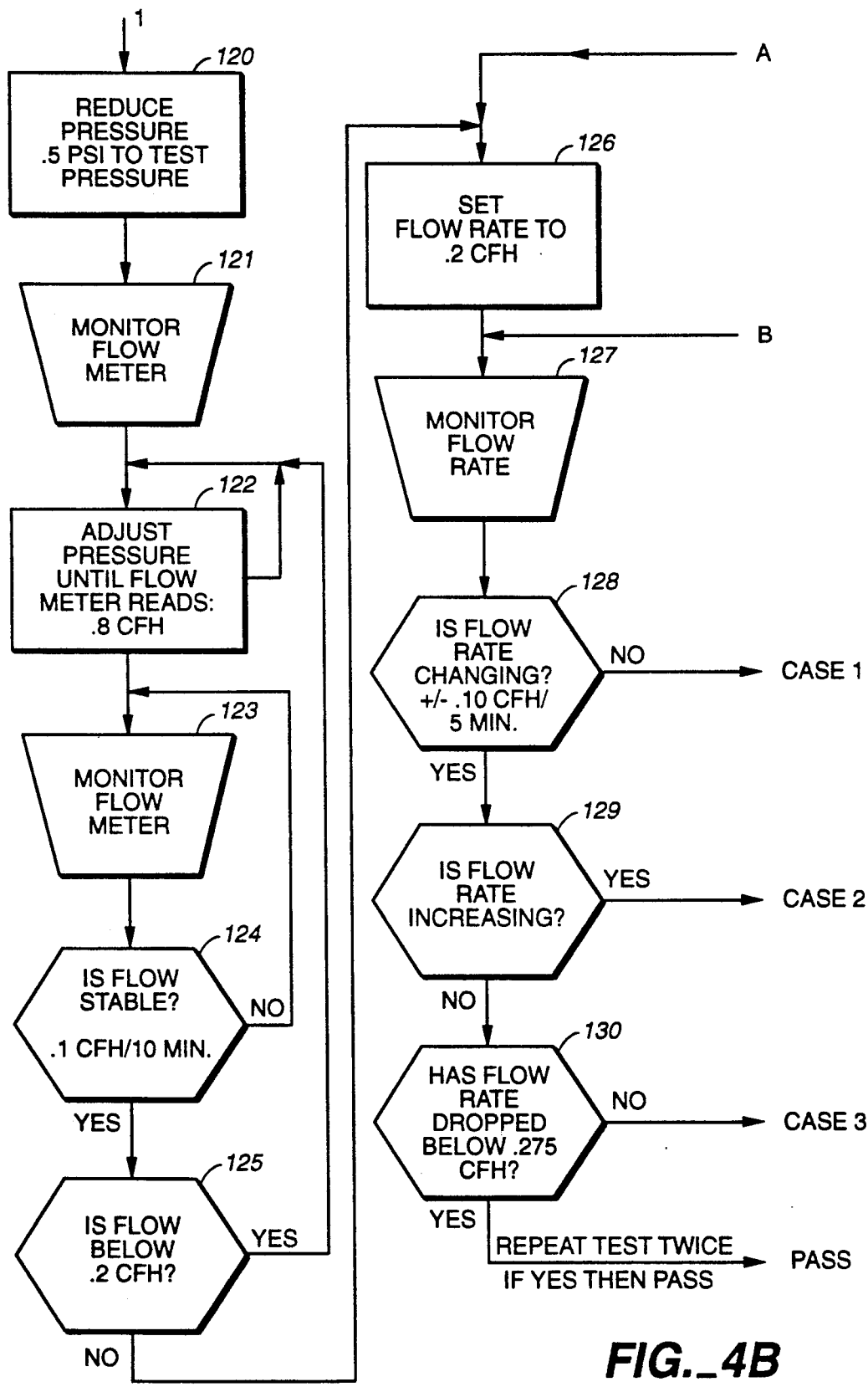
FIG._4B

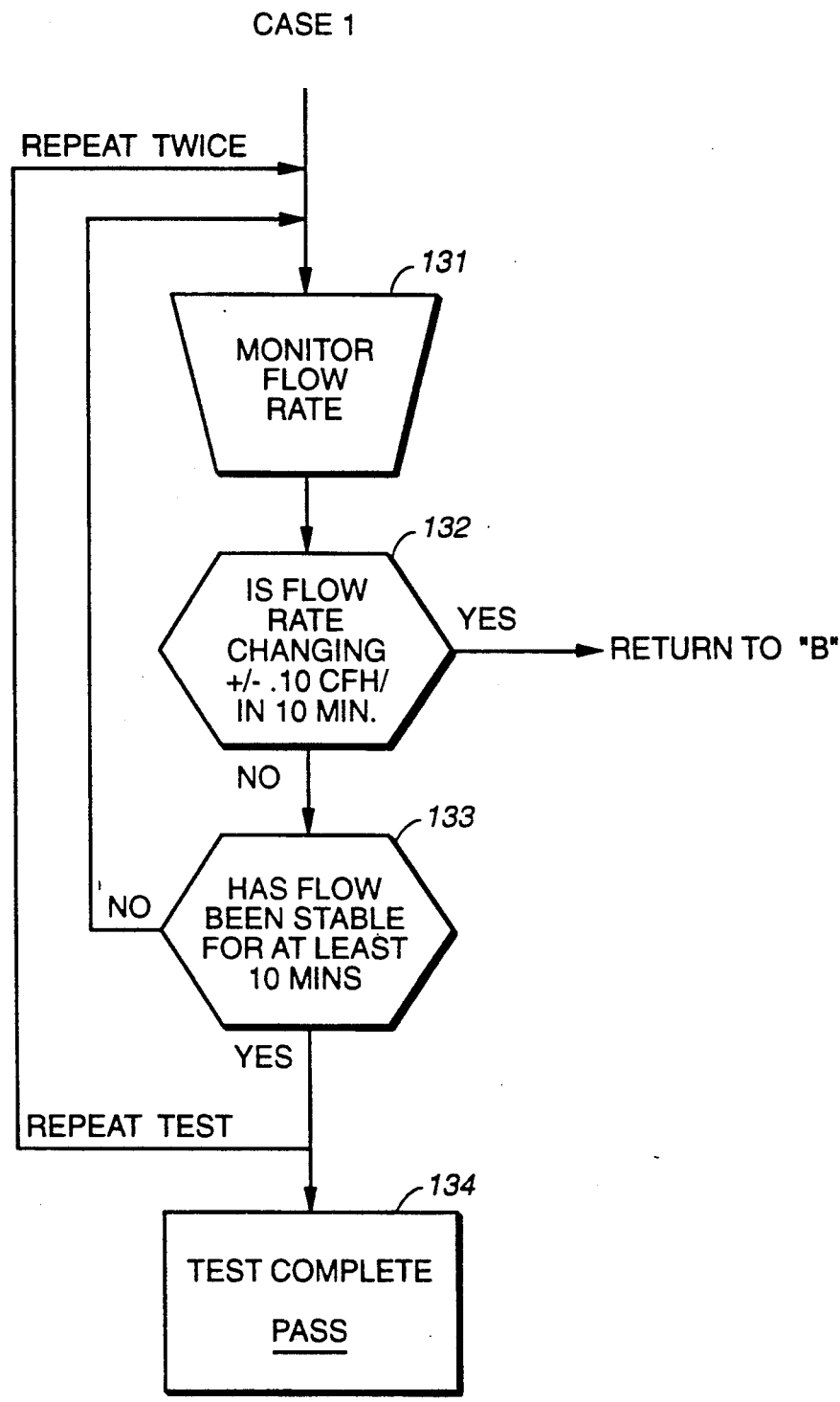
FIG._4C

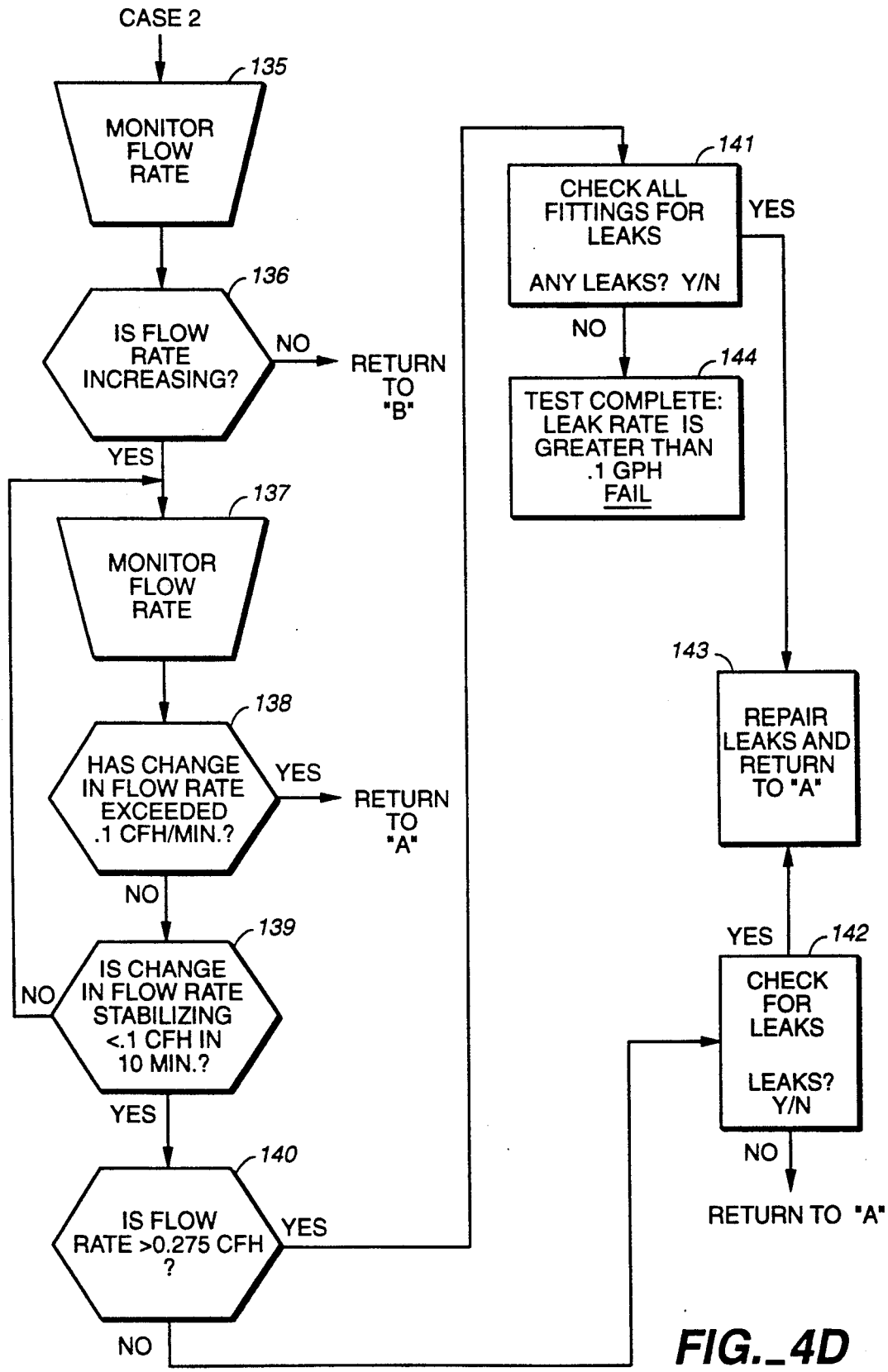
FIG._4D

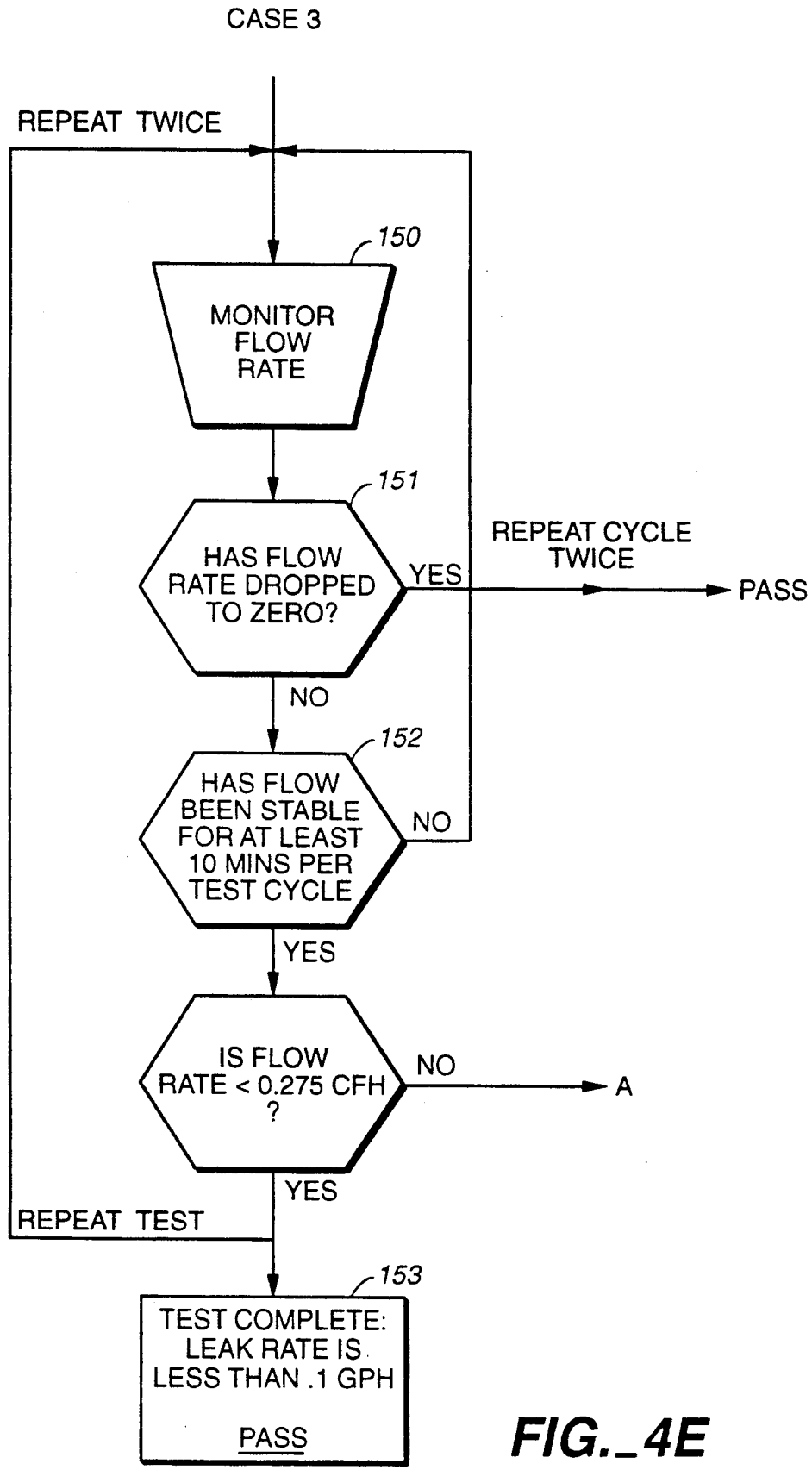
FIG._4E

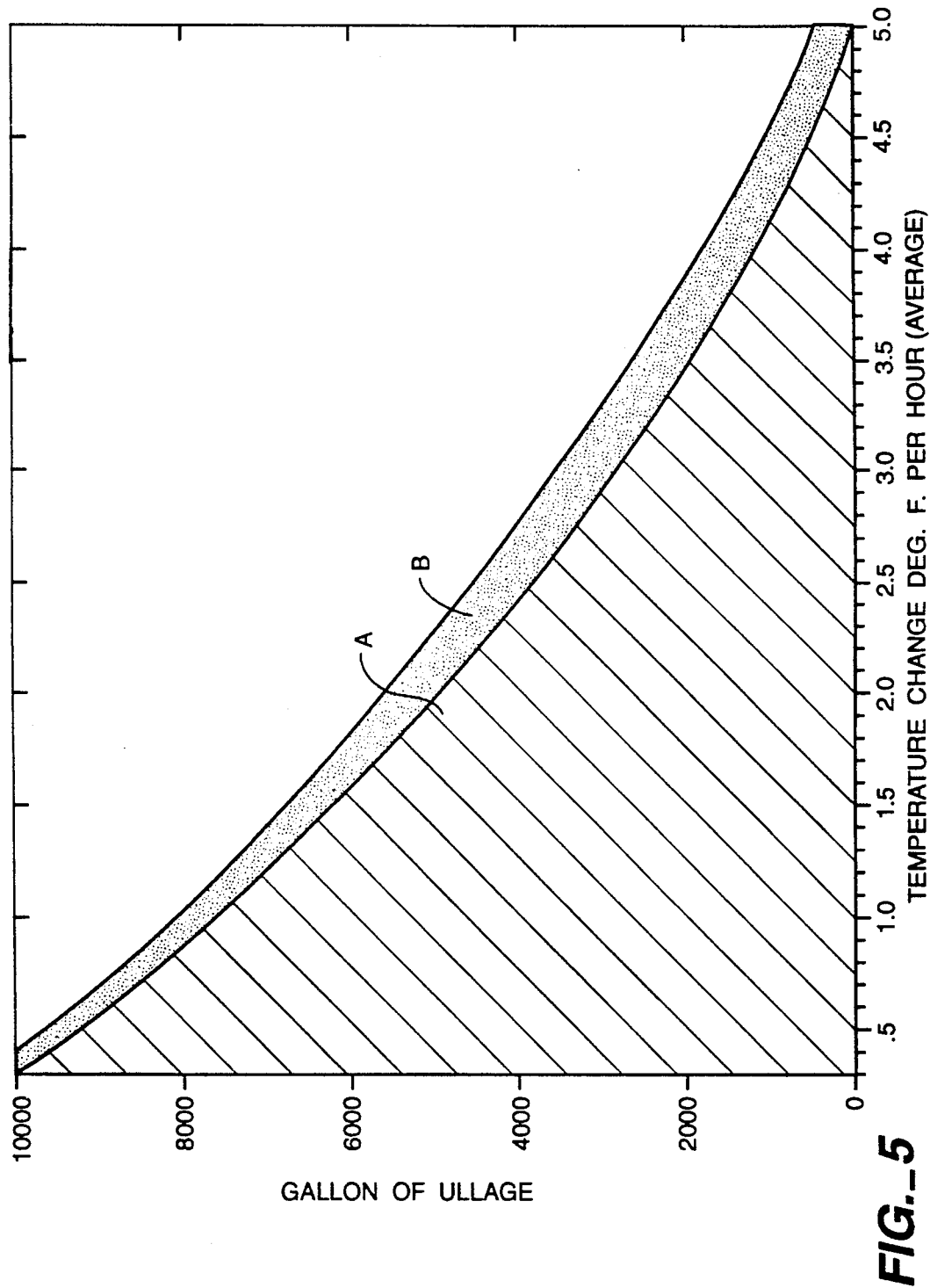
FIG._5

METHOD AND APPARATUS FOR DETECTING LEAKS IN THE ULLAGE OF A LIQUID STORAGE TANK

FIELD OF THE INVENTION

This invention relates to the field of leak detection for aboveground and underground storage tanks and the like.

BACKGROUND OF THE INVENTION

Tanks are used to store a wide variety of fluids and gasses, especially petroleum, as well as other liquids containing or consisting of various chemicals, and also for storing water. Many of these tanks and/or piping connected to the tanks when tested have been found to have active leaks or the potential for leaks. Some current estimates indicate that from 1% to 45%, or even more of such tanks have leaks. Leaking tanks and leaking tank piping can contaminate the ground water and cause other types of environmental pollution which become health and safety hazards.

In recent years leak detection methods have been developed to test underground storage tanks for leaks. In December 1988, the United States Environmental Protection Agency (U.S. EPA) adopted regulations requiring that such leak detection methods for underground storage tanks meet certain leak detection criteria, i.e. the ability to detect a 0.1 gph (gallon per hour) leak with a probability of detection of 95% and a false alarm rate of 5%. No known leak detection method has been able to meet this U.S. EPA leak detection requirement for (1) an empty tank and associated piping or (2) tank and piping together in which the tank is partially filled with liquid to less than 70% of its volume.

Several attempts have been made to solve this problem (i.e. U.S. Pat. Nos. 4,568,925; 4,353,245; 3,918,291; 3,893,332; 4,791,814; and 4,852,054). Each of these prior art devices and/or methods have certain disadvantages which make them unacceptable for detecting leakage in underground storage tanks of the low pressure variety. The testing methods in several of the cited patents require a precise measurement of the liquid level in the tank. These methods are unable to detect tank leaks where the leak is located above the liquid level in the tank or in its associated piping. Other methods require that the tank be pressurized to a very high pressure (i.e. 4000 psi for submarines, in order to determine the acceptability of leakage). Still other methods require that a nitrogen or helium detector be employed in such a way as to detect leakage of such gasses which are used to pressurize the tank. These methods require that the tank leakage flows be directed to the gas leak detector or that detector access to all parts of the tank and piping be provided so that the leak detector apparatus can sense low gas concentrations (indicating small leaks) as required by the EPA standards.

Prior art methods have been somewhat successful for detecting leaks in generally full tanks and tanks which are able to sustain high internal pressures. However, prior art methods have not been successful in meeting the EPA guidelines for empty or partially filled generally low pressure tanks and associated piping. The test results from prior art methods and devices are influenced by many of the effects associated with the underground and aboveground storage tanks such as: tank deflection, temperature changes, ground water, tank structure, ullage space, product level, and product type. The interaction of these effects can and does cause unacceptably inconsistent results from the prior art test devices and methods.

SUMMARY OF THE INVENTION

This invention provides a solution to the problem previously described and describes devices and methods which meet U.S. EPA guidelines. This invention relates to a leak detection system for periodic and continuous leak measurements for underground and aboveground storage tanks, piping, and the like. It includes an apparatus and method to be employed in empty or partially filled storage tanks. This invention can be used with tanks of all sizes, manufacture and containing any liquid or gas.

Moreover, a test method according to this invention can test a tank in a minimum of 45 minutes, when an initial waiting time is not required (such as after a tank has just been filled). A test in accordance with the invention takes less time to perform than other methods now used (to test full or nearly full tanks) which currently meet the U.S. EPA regulatory leak detection requirements.

A test apparatus according to the invention consists of a gas source which is usually a highly compressed bottle of helium, nitrogen, or liquid nitrogen (an inert gas). The bottle is connected through a regulator which maintains a stable source pressure through a hose (optionally insulated) to a test control panel. The control panel has a high flow (fill) regulator which is used to initially pressurize the tank to be tested and a low flow precision (test) regulator which is used during the test. An insulated reinforced hose connects the control panel to a fill pipe/test riser fixture on the tank and its associated piping which has been sealed tight for the purposes of this test. A vent line is provided from the tank to vent the tank, as needed, before, during, and after test.

The fill pipe/test riser fixture according to the invention, connected to the insulated reinforced hose from the control panel to the tank, extends into the tank and hangs or rests on or near the bottom of the tank. Thus, if there is a minimal amount of liquid in the tank, (enough to cover the end of the fixture) gas injected through the fixture generally bubbles through the liquid into the tank. A small hole in the fixture just inside the tank assures that the pressure in the fill pipe is equalized with the pressure in the ullage of the tank. The temperature difference between the injected gas and liquid and gas already in the tank is reduced by bubbling the gas through the liquid in the tank into the ullage space. The bubbling tends to equalize the temperature of the liquid and the gas bubbling through it so that any temperature variation due to the addition of the pressurizing gas, whose temperature may differ substantially from the contents of the tank, is substantially reduced. This bubbling also brings the vapor pressure of the liquid and the gas in the tank to equilibrium thereby tending to eliminate possible errors due to different vapor pressure of different liquids or gases.

A temperature probe/sensor is attached to the fill pipe/test riser to monitor the gas temperature in the tank above the liquid in the tank. The temperature probe provides information on the temperature stability in the tank.

The method for testing tank leak detection according to the invention includes an initial step of determining whether there has been an extraordinary event which may require an initial waiting period (typically 2 hours) to allow the temperature of the tank and its contents to stabilize with its surroundings. Extraordinary events include tank filling or emptying or when a significant ullage temperature change is detected.

Other steps according to the invention include determining the tank volume, the fluid height in the tank, and the ground water elevation to calculate the tank internal pressure at the bottom of the tank. A tank test pressure should not allow the combined pressure (of the liquid and the gas pressure of the ullage) at the bottom of the tank to exceed the tank's manufacturers rated normal operating pressure when completely filled with liquid. For example, a nearly full tank will be tested at a low gas pressure while an empty tank will be tested at a relatively high gas pressure (the effect of any ground water pressure will also be canceled).

The tank and its piping are pressurized to approximately the maximum rated tank pressure. Once the tank is pressurized a stabilization period is required. The tank is checked for leaks during the stabilization period. After the stabilization period the tank pressure is reduced by approximately 0.5 psi to a test pressure. A test pressure regulator is then adjusted to provide a flow through a test flow meter. When flow is stable to within approximately 0.1 cfh/5 minutes, the flow of the gas into the tank is adjusted to be approximately 0.2 cfh and the flow rate is monitored.

The monitoring of the approximately 0.2 cfh flow rate needs to be evaluated against four reference criteria to reach a pass or fail grade for each test cycle. If two consecutive test cycles earn a pass grade, then the tank tested is considered to be tight. If three consecutive test cycles earn a fail grade, then the tank tested is considered to be leaking.

The four reference criteria are as follows: (1) When the flowrate has been stable for at least five minutes for every 1000 gallons of ullage volume and the flow rate changing at less than 0.1 cfh in 5 minutes, is the flow rate less than 0.275 cfh, if yes, then the test cycle is a pass. (2) If the flow rate is changing at more than 0.10 cfh per 10 minutes and the flow is increasing, but the change in flow rate has not exceeded 0.1 cfh per minute but is stabilizing at less than 0.1 cfh in 5 minutes and is greater than 0.275 cfh and no leaks are found in the fittings or piping, then the test cycle is a fail. (3) If the flow rate is changing at greater than 0.1 cfh/5 minutes, the flow rate is dropping but has not dropped to zero and has been stable for at least 5 minutes for each 1000 gallons of ullage volume then the test cycle is a pass. (4) If the flow has dropped to zero, for a ten minute period and has been stable for 5 minutes/1000 gallons of ullage, then the test cycle is considered a pass.

Temperature within the ullage space is monitored continuously during the test to determine if the rate of temperature change falls within the criteria specified for the tank, product type and ullage volume. This leak detection method neutralizes any minor influences the temperature may have on the ullage volume. The recommended temperature range for the test based on the temperature of the ullage space is indicated in FIG. 5 (typical temperature change limits are indicated for diesel type fuel).

BRIEF DESCRIPTION OF THE DRAWINGS

FIG. 1. shows a schematic view of the apparatus of the invention;

FIG. 2. shows a cross section of an insulated hose of FIG. 1;

FIG. 3. shows a perspective view of the bottom of the fill pipe/test riser of FIG. 1;

FIGS. 4A, 4B, 4C, 4D, and 4E, show a flow chart for the tank testing method according to the invention; and FIG. 5 shows a temperature stabilization chart.

DETAILED DESCRIPTION OF AN EMBODIMENT

In FIG. 1. an example of a test apparatus according to the invention can be seen. The apparatus is attached to an underground tank 30. The apparatus consists of a gas source 40 attached to a gas pressure regulator 41 connected through an hose 42 to a pressure control panel 10. The outlet of the pressure control panel 10 is connected by a quick connect fitting to an insulated tank hose 18 which connects the panel 10 to the riser test fixture 20. The riser test fixture 20 seals the fill opening 29 on the tank 30. The riser test fixture 20 has a temperature probe 26, a supply pipe and a test vent pipe 22.

A typical tank 30 which is commonly tested includes a vent opening 33, a vapor recovery opening 34, and other tank piping 35, all of which must be plugged, capped, or otherwise sealed off for the test. A tank injection hose 21, is constructed of plastic tubing impervious to petroleum and is capped at the end. The length of the hose 21 is such that it reaches the bottom of the largest tank expected to be tested. The bottom end of the tube 21 (FIG. 3) is capped with a brass cap 46 with a 5/16 inch hole 49 drilled in the end of the cap. The last foot 44 at the end of the hose 21 contains a series of ¼ inch holes 45 to act as a dispersion manifold for the gas introduced into the tank 30 through the hose 21. The end of the hose is ballasted by a flexible connector 48 (a wire) connecting the cap 46 to a lead ball 47, (a one pound weight is effective). The top end of the hose 21 contains an equalization hole 21a which allows the pressure in the injection hose 21 to equalize with the pressure in an ullage 32 of the tank 30 when there is not significant flow into the tank 30. The hole 21a is 1/16"-⅛" in diameter.

The insulated tank hose 18 between the pressure control panel 10 and the tank 30 is insulated with closed cell "insul foam" insulation for its full length not necessarily covering its end fittings. Cross sections typical of both hoses are shown in FIG. 2, i.e., a hose 38 (preferably including reinforced petroleum resistant rubber) is surrounded by insulation 39 (preferably closed cell foam).

A schematic diagram of the pressure control panel 10 is shown in FIG. 1. The pressure control panel 10 includes a gas inlet 11 which connects by tubing or piping to a fill regulator 14 and a precision test regulator 12. The fill regulator 14 is connected to a fill/test valve 15 which is a three-way valve isolating the panel piping in either a fill or a test mode. The discharge pipe 38 from the fill/test valve 15 for each tank test cell 43D (four are shown in this control panel) is connected to a pressure gauge 19, a pressure relief valve 16, to a shut off valve 17, and to an external connection. The external connection connects the panel 10 through the insulated hose 18 to the tank 30. Each tank test cell 43A, 43B, 43C, 43D is connectable to its own tank.

The discharge of the precision pressure test regulator 12 flows through a very precise flow meter capable of measuring a very low flow rate (preferably a minimum of 0.025 cubic feet per hour (cfh) or less) and then is piped to the three-way fill/test valve 15 which also connects to the discharge pipe 38 of each tank test cell of the pressure control panel 10.

The riser test fixture 20 includes a fill valve 28 connected to a pipe 21b passing through a test cap 20a and to the injection hose 21 within the tank 30. The test cap 20a has a second pipe nozzle which connects to the test vent pipe 22. The test vent pipe 22 during a test is connected to the tank instrument pipe 27. The tank instrument pipe 27 connects to the test vent valve 23, the tank pressure gauge 24, and the tank test pressure relief valve 25. The test connections 43 can connect to up to three other tanks, which can be tested simultaneously.

The temperature sensitivity in the ullage volume of tanks, their piping, and temporarily connected test tubing/piping and their related thermal expansion has been discovered to be quite high. Small unexplained changes in internal temperature or temperature variations in tanks due to temperature instability could cause errors in evaluating tanks for leakage. For this reason the temperature sensor 26 (also part of the test riser 20) extends into the ullage space 32 of the tank 30. The temperature is monitored and recorded on a temperature data logger recording device (not shown). The temperature (or any change in the temperature) in the ullage space 32 during the entire test period can later be reviewed, if necessary.

The apparatus of this invention includes insulation for the gas supply hoses 18 feeding the tank 30 being tested, thereby reducing any thermal effect that might appear as a result of direct sunlight, shadows or freezing precipitation falling on the hoses 18 causing their internal volumes to change. The gas injected through the fill hose 21 (preferably an inert gas such as helium or nitrogen from the supply tank 40) into the tank 30 being tested is generally injected through the liquid 31 in the tank 30 (some gas passes directly into the tank through the equalizing hole 21a). The gas bubbles up through the liquid 31 already at a stable temperature within the tank 30. This forced mixing of injected gas and liquid 31 causes the temperatures of the injected test gas and stable liquid 31 to equalize and thereby assists in reducing any significant temperature differentials within the tank ullage 32 by introducing forced convection as a result of the agitation created by the bubbles. This reduces the time needed to achieve temperature stability prior to the start of a test cycle. This injection process also aids in equalizing the vapor pressure of products in the tank.

The control panel 10, FIG. 1, provides a fill regulator 14 which, when the fill/test valve 15 is placed in the fill position, provides relatively quick pressurization of the tank 30 to a predetermined fill pressure. The temperature within the tank is monitored for the duration of the test, the temperature is automatically recorded. After the gas is injected into the tank 30 and the required stabilization period has passed (typically five minutes for every 1000 gallons of ullage), the pressure in the tank 30 is reduced up to 0.5 psi by using the vent valve 23 (or other vent openings). The fill/test valve 15 is then turned to the test position. The flow rate, temperature, and pressure are monitored during the pressure reduction using the precise flow meter 13, the temperature probe 26, and the pressure gauge 19. The precision test regulator 12 has been adjusted prior to the test to the appropriate pressure for conducting the test of the tank 30 and is capable of maintaining the pressure during the test in the ullage 32 and tank 30 typically within plus or minus 0.02 psi of a set point. The precision flow meter 13 is capable of monitoring flows as low as approximately 0.025 cfh and typically as high as 1.0 cfh.

The flow meter 13 is monitored while the pressure regulator 12 is adjusted until the flow rate reaches 0.8 cfh. The fill/test valve 15 remains in the test position. The tank 30 is allowed to stabilize at this flow rate (typically 0.8 cfh) for a period of time dependent on the ullage volume 32 of the tank under test (typically ten minutes). If the flow remains stable or decreases during the stabilization period, then the flow is adjusted to 0.2 cfh using the test regulator 12. When the flow meter 13 indicates approximately 0.2 cfh the flow rate, temperature, and pressure are recorded. Depending on the results of the monitoring of the flow meter 13, the test could indicate a tight or leaking storage tank. The data from these devices when evaluated according to a detailed test protocol according to the invention will enable a test technician to confidently determine whether a tank is leaking or not.

The following example illustrates principles of the invention: a 10,000 gallon tank has a liquid volume of 5,000 gallons. The ullage volume is 5,000 gallons. The initial time required for stabilization will be approximately 25 minutes (5000/1000×five minutes). The fill pressure for this example will be approximately 3.5 psi (5 psi maximum tank pressure minus 1.47 psi (for liquid pressure of 0.89 s.g. liquid at bottom of tank)) and the test pressure will be approximately 3.0 psi (3.5−0.5). Total test time after stabilization will depend on the flow meter indications and other external effects that affect the test.

At this point all of the hoses 42, 18, should be connected, the plugs, caps, and boots should be installed on the tank so that the tank is tight and able to hold gas pressure. The gas source 40 which is either helium or nitrogen is then connected to the test panel 10 and the gas fill pressure regulator 41 is adjusted to approximately 40 psi. The test pressure, ullage volume, stability time, and fill pressure are calculated parameters. The test fill pressure will depend on the height of the liquid in the tank. The pressure should be approximately 1.0, 1.5, 2.0, 2½, 3.0, 3½, or 4 psi, depending on whether the tank is nearly full, approximately half full or nearly empty (3.5 psi for this example). For this example, the fluid volume is 5,000 gallons and the total volume is 10,000 gallons. The ullage volume is the difference between the tank capacity and the fluid volume (preferably in U.S. gallons).

In general, for a 10,000 gallon tank the test pressure and stability time are determined as follows (assuming a tank maximum pressure rating of 5 psi). The fill pressure is approximately 2.5 psi if the liquid product volume is above 75% or if the ullage volume is approximately 2000 gallons, approximately 3.5 psi if the liquid product volume is below 75% but greater than 33% or if the ullage volume between approximately 2000 gallons and 6000 gallons and approximately 4 psi if the liquid product volume is below 33% or if the ullage volume is greater than 6000 gallons. The stabilization time is 5 minutes per 1000 gallons of ullage volume (i.e. for a tank with a 5000 gallon ullage, 25 minutes for stabilization). The test pressure and fill pressure are calculated based on the ullage volume of the tank and the total volume of the tank under test. For this example, the test pressure is 3.0 psi and the fill pressure is 3.5 psi.

The ullage pressure should always provide a 1 psi differential between the internal tank pressure and the static head pressure of the ground water surrounding the tank. Thus a leak in the tank will be of a higher pressure than the pressure exerted by the ground water (even with the tank and piping completely submerged). The gas will escape and be detected by the ullage leak detection system. The depth 37 of the tank 30 below grade must be determined and ground water pressure should be calculated so that the internal pressure inside the ullage area of the tank is greater than the ground water pressure. For example, if ground water level was at the top of the tank and tank diameter was 97" the pressure of the water would be 3.5 psi at the bottom of the tank pushing in. The pressure of the gas in the ullage space must be greater than the pressure of the water outside the tank (3.5 psi). A pressure of 4.5 psi at the inside bottom of the tank will meet the 1 psi differential and be below the maximum tank allowable pressure (commonly understood to be a differential pressure rating of the limits of the internal tank pressure greater than the external tank pressure) of 5 psi at the bottom of the tank. It is preferable that the minimum differential pressure between the inside and outside of the tank at the bottom of the tank during testing be 1 psi. The maximum fill pressure should never cause the differential pressure between the inside and outside of the tank at the bottom of the tank to exceed the maximum tank allowable pressure. When deeply submerged in ground water, a tank's internal test pressure may exceed 5 psi as measured in the ullage, but the differential pressure between the inside and outside of the tank should not and under this method will not exceed 5 psi (the maximum allowable pressure). Calculating the fill and test pressures for a tank immersed partially or completely in ground water involves choosing a test pressure approximately 0.5 psi below a fill pressure such that the test pressure causes the internal pressure at the inside of the bottom of the tank to exceed the external pressure at the bottom of the tank by 1 psi or more, but does not cause the differential pressure between the inside and outside of the tank at the bottom of the tank (inside greater than outside) to exceed the maximum tank allowable pressure (commonly 5 psi).

The test duration (typically 30 minutes) is based on the ullage volume of the tank under test. The test results are indicated corresponding to a flow rate exceeding a threshold for nitrogen or helium. The fill regulator 14 on the control panel 10 allows the initial fill pressure to be applied to all tanks under test. Each tank is provided with a separate pressure gauge 19 on the control panel 10 for the monitoring of the tank ullage pressure. Prior to conducting the test, a waiting period may be required, but only if just prior to the test the tank has experienced a substantial change in the product level (tank was substantially filled or emptied) or external environment change (a storm). Changes in the temperature of the ullage should be evaluated with FIG. 5. Points within the shaded area part of the graph define acceptable test conditions for a typical 10,000 gallon tank containing diesel. Points above the shaded part of part of the graph are generally unacceptable, but may be used when environmental factors appear to be stabilizing. Rates of temperature change above the shaded part of the graph require the test duration be extended until temperature variation is within the shaded area.

A flow chart of the steps to be taken to perform a test is described in FIGS. 4A, 4B, 4C, 4D and 4E (this description assumes a standard gasoline storage tank).

Starting with FIG. 4A and the start step (100), the site preparation (101) involves contacting the site manager, coordinating the outage of the tank(s) and establishing the required safety procedures for the tanks and location to be tested. The next step (102) involves determining the tank volume (for example 10,000 gallons), tank diameter (for example 92"), and fluid height within the tank (for example 45"). The tank volume of a normally horizontal cylindrical tank can be determined by determining its diameter and length and using that data to extract from reference tables the size of tanks with such dimensions. The fluid height is then measured by dipping the tank, but this need not be done very precisely. A dip stick measurement is all that is really required to calculate the ullage volume. Various test parameters are then calculated (103). Examples are discussed at other places in this application.

The riser test valves 28 on the tank should be closed at this time to allow testing of all of the hose connections for leakage. At this point an initial test of the unit should be performed. The fill/test valve 15 should then be turned to the fill position and the fill regulator 14 should be adjusted until the panel pressure relief valve 16 starts to open (typically 5.0 psi). This pressure level should be recorded and all the pressure gauges 19 should read within 0.1 psi of each other. The pressure should then be reduced by 0.5 psi so that the pressure is below the pressure relief valve 16 pressure and all internal fittings should be checked using a soap solution for leaks. The fill regulator 14 should be turned to its off position. The fill/test valve 15 on the pressure control panel 10 should then be turned to its test position. The precision test regulator 12 should be adjusted to apply 5 psi as indicated on the tank pressure gauge 19 on the control panel 10. The ball indicators in each flow meter 13 should move freely when increasing the pressure with the test regulator 12, and as equilibrium is reached, the ball in the flow meter 13 should drop to zero. If there is still an indication of flow after several minutes there could be an internal leak to the system. This should be checked further and repaired before continuing.

At this point the test regulator 12 should be adjusted to the appropriate test pressure (3.0 psi for this example) as indicated on the pressure gauge 19 and the fill/test valve 15 should be turned to its off position. This concludes step (104) as shown in FIG. 4A.

After tank fill hose 18 is connected, place the fill/test valve 15 in its fill position. Open output valve 17 on the control panel 10 and riser test valve 28 and close vent valve 23 on the riser test fixture 20. Adjust the fill regulator 14 on the control panel 10 to the appropriate pressure as determined from the calculations performed in step (103) (2.5 psi if the ullage volume is above 75%, 3.5 psi if the ullage volume is below 75% but greater than 33%, and 4 psi if the ullage volume is below 33%. For this example 3.5 psi). Monitor the tank pressure gauge 24 on the tank riser test fixture 20 to confirm that the pressure is increasing in the ullage space 32 of the tank 30. (105, 106, 107).

The fill time will depend on the ullage volume 32 and the fill pressure. Record the time, temperature, and pressures at the beginning of the fill cycle for each of the tanks to be tested. If it appears that there is a long delay in the time required to reach 1 psi as indicated on the tank pressure gauge 24, the filling should be stopped and the tank should be visually inspected for leaks. The pressure and temperature in the tank should be recorded throughout the entire test. Once the tank has been pressurized, it is necessary for the tank to stabilize for the predetermined stabilization period (108) (for this example approximately 25 minutes). Maintain the pressure for a predetermined period of time based on the ullage volume. This period of time will allow the tank under test to stabilize from any changes that could affect the results of the test. Checking for any leaks should be done during this time (109). Leaks can be detected using many methods, of these there are visual detection, soap bubble, acoustic and helium.

Tank deflection or deformation can be expected when applying pressure to the ullage space 32 within the tank 30. To overcome any significant error caused by this effect, the tank is pressurized to a pressure slightly higher than the test pressure (typically 0.5 psi higher) for the stabilization period. During this time the pressure, temperature, and any anomalies should be recorded for any instability that could be caused by tank deformation. The monitoring period is typically every five minutes.

Temperature changes could create an unstable test. The stabilization period described also provides the necessary time for temperature stabilization.

Product vapor pressure of a few liquids may create an unstable test. High product vapor pressure may mask a leak. Therefore, it will be necessary to perform the test at a pressure level high enough to overcome the effects of any vaporization from the liquid stored. The injection of the gas through the liquid stored in the tank will decrease the vaporization effect of high vapor pressure liquids.

In other embodiments, tanks for storing liquids having high vapor pressure are designed to withstand the additional pressure of these liquids. Therefore, the test pressure to test these tanks containing liquids having high vapor pressure are greater than for normal tanks. The same techniques described here can be applied assuming that the pressure rating of all pieces of the test apparatus are greater than the required/desired fill and test pressures.

Once stabilization is complete (110) it is necessary to bleed off or reduce the pressure in the tank slowly to the test pressure. This is done by the use of the test vent valve 23 (120) FIG. 4B. The fill/test valve 15 should be placed to its test position and the venting should stop when the flow meter 13 indicates a flow of 0.8 cfh. (121, 122). The test pressure of approximately 3.0 psi for this example should be maintained.

The flow should be monitored (123) to see if it is stable within 0.1 cfh for approximately 5 minutes (124). If it is not stable, the flow should be readjusted to 0.8 cfh after 5 minutes. If the flow decreases below 0.2 cfh and is readjusted two times back to 0.8 cfh the third time the flow decreases to below 0.2 cfh the test proceeds to step (126). If the flow has stabilized, after the required time, the flow is reduced to 0.2 cfh by adjusting the pressure in the tank by using the fill regulator 14. The tank pressure, temperature, and flow should be monitored and recorded during the test. If the flow rate does not change plus or minus 0.1 cfh within 5 minutes (128) the test continues and the tank is continuously monitored for the duration of the test (131) FIG. 4C. If the flow rate remains stable (132) for at least 10 minutes and remains below the 0.275 cfh threshold, the test is complete (134) and considered a pass.

If the flow rate has changed within the 10 minutes (132) flow rate should be readjusted to 0.2 cfh (126) and monitoring continues (127). If the flow rate continues to change (128) plus or minus 0.1 cfh in 10 minutes and the flow rate is increasing (129) the flow rate is monitored (135) FIG. 4D. If the flow rate is increasing (136), continue monitoring for the predetermined intervals and recording temperature, flow, and pressure. If flow rate has changed more than 0.1 cfh (138) and the flow is greater than the threshold (0.275 cfh for this example) (140), then readjust the flow to 0.2 cfh (126) this should be done three time in succession. If after the third time the flow rate is greater than the threshold, then check all the fittings (141, 142, 143). If the fittings are tight the test is considered complete and a leak greater than 0.1 gph leak is evidence (144) of a failure. If leaks are discovered in step (141) they should be repaired (143) and the test returns to 'A' (126) FIG. 4B. If the flow rate is greater than 0.1 cfh but less than the threshold (180), check for the presence of small leaks and return to 'A' (126) FIG. 4B.

If the flow rate indicated in step (128) is changing 0.1 cfh during the 10 minute monitoring time (130), the test should be repeated by returning to step (126), if the flow has decreased two times in succession during the repeated test cycles the tank is declared tight and passes. If the flow did not drop to zero (130) continue to monitor the temperature, pressure, and flow rate (150), FIG. 4E. If the flow rate drops to zero (151), repeat the test twice in succession monitoring for 10 minutes per test. If the flow rate is below 0.275 cfh the tank is declared to pass with a indicated leak rate below 0.1 gph (153).

Since the flow meter may fluctuate during the test, a data reading or an acceptable data point is specified as staying within the specified flow tolerances for a fixed period of time, i.e. plus/minus 0.1 cfh for helium and nitrogen for a ten minute period. The flow rate is manually reset (by adjusting the pressure) to its initial adjustment and again record data for ten minutes.

A final test result (tank tight, tank leaks) requires repeat threshold exceedances (flow rates above or below a predetermined level) over a specified time interval so that several consistent test cycles are required to declare a tank test a leak or a pass. Tank deflection effects become minimal due to the requirement of multiple test cycles which require stable flow rate for a completed test (+/−0.1 cfh for 10 minutes).

A computer may be used to record and/or conduct the test. The device operates as indicated in the preceding description FIG. 4A, 4B, 4C, 4D and 4E except the recording, monitoring, and indication are controller via a computer interface. The computer interface monitors the pressure, flow, and temperature during the entire test. The information gained during the test is automatically recorded by the computer and is calculated to arrive at the final results or report using flow charts and temperature curves.

While the invention has been described with regards to specific embodiments, those skilled in the art will recognize that changes can be made in the form and detail without departing from the spirit and scope of the invention.

What is claimed is:

1. An apparatus for detecting and measuring leaks in a closed partially filled or empty tank comprising:
   pressure control means for regulating pressure of gas supplied at an inlet of said pressure control means to a pre-set value and including means for monitoring flow of gas through said pressure control means to an outlet of said pressure control means;
   test cap means for sealing an opening of the tank, said test cap means having an opening therethrough, first connecting means for connecting said outlet of said pressure control means to a first side of said opening of said test cap means, said first connecting means having insulation substantially covering said first connecting means; and injection means having a first end connected to a second side of said opening in said test cap means extending into and to a point substantially adjacent to the bottom of said partially filled or empty tank, said injection means having a first aperture at or near said first end of said injection means, said injection means having a set of one or more second apertures at or near a second end of said injection means, for injecting said gas into the tank through said first and second apertures, wherein a cross sectional area of said first aperture is substantially less than a cross sectional area of said set of second apertures.

2. An apparatus in claim 1 further comprising gas source means for supplying gas from a gas source through a second connecting means to an inlet of said pressure control means.

3. An apparatus as in claim 2, wherein insulation substantially covers said second connecting means.

4. An apparatus as in claim 1, wherein said injection means is a flexible tube.

5. An apparatus as in claim 4, wherein said flexible tube is attached to a ballast weight at said second end.

6. An apparatus as in claim 1, wherein said test cap means includes a temperature probe configured to measure temperature inside the tank wherein said temperature probe is disposed at approximately the center of the ullage of said tank.

7. An apparatus as in claim 1, further comprising a fill regulator providing a second flow path between the gas source and said first connecting means when a fill/test valve included in said pressure control means is turned to a fill position.

8. An apparatus as in claim 1, wherein a plurality of pressure control means are provided, each individually connected to a separate tank.

9. An apparatus as in claim 1, wherein said pressure control means includes a pressure gauge which senses the pressure at said outlet of said pressure control means.

10. A method contributing to the detection and measurement of leaks in a closed tank comprising the steps of:

determining the tank's liquid level history for a first predetermined period of time prior to the test;
deciding whether to wait for a second predetermined period of time if there has been a substantial change in the tank's liquid volume;
determining the tank's dimensions;
determining the level of liquid in the tank;
calculating the ullage volume of the tank;
calculating a maximum tank fill pressure so that the pressure at the bottom of the tank does not exceed a maximum tank allowable pressure;
pressurizing the tank from a gas source to the maximum tank fill pressure;
holding the tank at the maximum tank fill pressure for a third predetermined time until said test pressure is stable to within a first predetermined tolerance;
recording the tank ullage temperature;
venting the tank to arrive at a test pressure;
monitoring the flow rate of gas into the tank at the test pressure for a fourth predetermined time while maintaining the pressure at said test pressure within a second predetermined tolerance;
identifying a first stable flow rate; and
comparing said first stable flow rate with a reference criteria to determine whether, this, a first test cycle receives a passing grade because no unacceptable leak was detected.

11. A method for detecting and measuring leaks in an underground tank and piping partially filled with liquid comprising:

measuring the flow rate of a gas into the tank over a predetermined interval while simultaneously maintaining constant pressure in the tank and determining whether a leak has occurred based on a plurality of test cycles as described in claim 10, wherein a second cycle of said plurality immediately follows said first test cycle whose results are compared against a set of acceptance criteria.

12. The method of claim 11, wherein an insulated hose is connected from a control panel to the tank for injecting said gas during the step of measuring said flow rate.

13. A method as in claim 10, wherein said step of calculating said maximum tank fill pressure includes:

subtracting from the maximum tank allowable operating pressure, the pressure at the bottom of the tank due only to the liquid level inside the tank, arriving at a remainder; and
determining whether the ground water level outside the tank is higher than the bottom of the tank, and when the ground water level outside the tank is higher than the bottom of the tank;
determining the ground water pressure at the bottom of the tank; and
adding to said remainder said ground water pressure.

14. A method as in claim 10, wherein said step of comparing said first stable flow rate with said reference criteria includes performing and monitoring a set of at least two test cycles which repeatedly provide data that show whether each test cycle receives a passing grade because no acceptable leak was detected.

15. A method as in claim 10, wherein the step of recording the tank temperature includes verifying that the tank ullage temperature has stayed within a predetermined set of prescribed temperature limits throughout a series of test cycles to establish a valid test.

16. A method contributing to the detection and measurement of leaks in a closed tank as in claim 10, further comprising the steps of:

performing a second test cycle by:
recording the tank ullage temperature;
monitoring the flow rate of gas into the tank at the test pressure for said fourth predetermined time while maintaining the pressure at said test pressure within said second predetermined tolerance;
identifying a second stable flow rate; and
comparing said second stable flow rate with said reference criteria to determine whether, said second test cycle receives a passing grade because no unacceptable leak was detected.

17. A method contributing to the detection and measurement of leaks in a closed tank as in claim 16, further comprising the steps of:

determining whether said first test cycle and said second test cycle have both received a passing grade because no acceptable leak was detected and if they have then reporting that the tank meets the leakage criteria.

18. A device to be used in conjunction with an apparatus for detecting leaks in a closed tank comprising:

a gas injection tube having a first end connected to an aperture extending through a test cap means dealing an opening of said tank, said tube extending into and to a point substantially adjacent to the bottom of said closed tank, said injection tube having a first aperture at or near said first end of said injection tube, said injection means having a set of one or more second apertures at or near a second end of said injection means, for injecting said gas into the tank through said first and second apertures, wherein a cross sectional area of said first aperture is substantially less than a cross sectional area of said set of second apertures.

* * * * *